(12) United States Patent
Wu et al.

(10) Patent No.: US 8,116,585 B2
(45) Date of Patent: Feb. 14, 2012

(54) BACKGROUND NOISE DETECTION ON RENDERED DOCUMENTS

(75) Inventors: Wencheng Wu, Webster, NY (US); R. Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1198 days.

(21) Appl. No.: 11/836,504

(22) Filed: Aug. 9, 2007

(65) Prior Publication Data

US 2009/0041370 A1 Feb. 12, 2009

(51) Int. Cl.
*G06K 9/40* (2006.01)
(52) U.S. Cl. .................................. 382/275; 382/260
(58) Field of Classification Search .................. 382/260, 382/275, 282, 283; 358/3.03, 3.09, 3.26, 358/1.3, 518, 538
See application file for complete search history.

(56) References Cited

U.S. PATENT DOCUMENTS

| | | |
|---|---|---|
| 4,311,914 A | 1/1982 | Huber |
| 5,107,332 A | 4/1992 | Chan |
| 5,235,652 A | 8/1993 | Nally |
| 5,510,896 A | 4/1996 | Wafler |
| 5,535,313 A | 7/1996 | Schwab |
| 5,587,728 A | 12/1996 | Edgar |
| 5,884,118 A | 3/1999 | Mestha et al. |
| 5,999,636 A | 12/1999 | Juang |
| 6,006,048 A | 12/1999 | Folkins |
| 6,377,758 B1 | 4/2002 | OuYang et al. |
| 6,665,425 B1 | 12/2003 | Sampath et al. |
| 6,724,461 B1 | 4/2004 | Yamazaki |
| 6,970,606 B2 * | 11/2005 | Lee et al. ................. 382/270 |
| 6,987,886 B1 * | 1/2006 | Okubo et al. ............ 382/194 |
| 7,623,728 B2 * | 11/2009 | Avinash et al. .......... 382/275 |
| 2002/0145747 A1 | 10/2002 | Burquist et al. |
| 2004/0042680 A1* | 3/2004 | Saund ....................... 382/274 |
| 2006/0038828 A1 | 2/2006 | Klassen et al. |
| 2006/0110009 A1 | 5/2006 | Klassen et al. |
| 2007/0003109 A1 | 1/2007 | Wu et al. |

* cited by examiner

*Primary Examiner* — Yon Couso
(74) *Attorney, Agent, or Firm* — Fay Sharpe LLP

(57) ABSTRACT

A method of detecting background noise in a rendered electronic image derived from an electronic image includes capturing a rendered image to generate captured image data. From the captured image data, a subset of the image data corresponding to a region of interest in the electronic image comprising only blank pixels is identified. For the subset of image data, any background noise in the rendered image not present in the electronic image is detected from the image data.

30 Claims, 5 Drawing Sheets

BACKGROUND NOISE DETECTION ON RENDERED DOCUMENTS

BACKGROUND

The exemplary embodiment relates to systems and methods for detecting image quality defects generated by a rendering device. It finds particular application in connection with a system and method for background noise detection on rendered customer documents and will be described with reference thereto.

Image rendering devices, such as photocopiers, printers, and facsimile machines, render digitally stored images in tangible form by applying marking materials, such as toners or inks, to print media, such as paper. One of the common print defects exhibited in such devices is background noise, which results in the rendered images having small marks that are not present in the original digital image. In electrographic image rendering devices, background noise generally consists of small dots caused by single toner particles or small clusters of toner particles. One source of background noise is "wrong sign toner" (an incorrect charge on a small minority of the toner particles), resulting in the particles being attracted to charged regions of the photoreceptor intended to be blank for that particular color separation. In devices of other non-impact printing technologies, background noise may result from a mist formed from the ink or other marking material which enters the air and subsequently adheres to the printed page. As a consequence, background noise generally lacks a repetitive distribution pattern (giving the appearance of salt and pepper sprinkled on a page), when compared with other image defects, such as bands or streaks. In a uniform region of the image, the dots may appear as a variation in the gray level. In general, "gray" refers to the optical density or area coverage value of any single color separation layer, whether the colorant is black, cyan, magenta, yellow, or some other color. When the level of background noise is low, the dots are often not visually objectionable. However, when more severe, corrective steps may be required to mitigate the problem. Because of the non-regularity of the background noise distribution, this may require adjustments to the device or a service visit for replacement of components of the image rendering device.

In one method for detecting imaging problems caused by an intermediate imaging member, a scanned, printed image of test patches is compared with its original printed image on a pixel by pixel basis. Because of the difficulty of accurately aligning images, the occasional background noise spots are treated as spurious results, below the detection threshold, and thus may not be detected by such a method.

Although background noise may not be perceptible to the naked eye, such image quality defects may indicate that the device is deteriorating, and presage image quality defects that are visible. Accordingly, it would be desirable to detect the image quality defects early, so the image rendering device may be adjusted or repaired.

INCORPORATION BY REFERENCE

The following references, the disclosures of which are incorporated herein in their entireties by reference, are mentioned:

U.S. Pub. No. 2006/0110009, entitled SYSTEMS AND METHODS FOR DETECTING IMAGE QUALITY DEFECTS, by Klassen, et al., discloses detecting image quality defects in images rendered by a rendering device. Original image data is rendered by an image rendering device, and the rendered image is captured by an image capturing device. Regions of interest may be identified to provide information indicating where image quality defects of the rendering device, may be identified. At each region of interest, the original image data may be compared to the captured image data of a corresponding region of interest to determine a color difference of the captured image at the region of interest. The color difference may be subsequently converted from a device independent color space to a device dependent color space. Based on the converted color difference and input intensity of the original image data at the region of interest, a colorant error may be determined for the region of interest.

U.S. Pat. No. 6,377,758 by OuYang, et al., describes a method and a system for analyzing imaging problems by printing an image, scanning the printed image and comparing the scanned image and the original image on a pixel by pixel basis to detect defects generated by an intermediate imaging member.

The following references relate generally to automated image quality diagnostic (AIQD) and adjustment methods: U.S. Pub. No. 2007/0003109 and U.S. Pat. Nos. 5,884,118 and 6,665,425.

U.S. Pat. No. 6,006,048 by Folkins discloses an electrophotographic reproduction machine including a detecting apparatus adjacent an image bearing member for sensing toner particles developed into non-image regions. Wrong-sign toner is attracted to the image bearing member and a sensor senses wrong-sign toner on the image bearing member.

BRIEF DESCRIPTION

In accordance with one aspect of the exemplary embodiment, a method of detecting background noise in a rendered electronic image is provided. The method includes capturing a rendered image to generate captured image data, the rendered image being derived from an electronic image. The method further includes identifying, from the captured image data, a subset of the image data corresponding to a region of only blank pixels in the electronic image and, from the subset of image data, detecting background noise in the rendered image not present in the electronic image by comparing the image data with background image data.

In accordance with another aspect of the exemplary embodiment, a background noise detection system, includes a source of an electronic image, the electronic image including electronic image data, a marking device for rendering an image based on the electronic image data, an image capture device for capturing the rendered image, the captured image including captured image data, a detection processor for identifying a region of interest in the electronic image, the region of interest including at least a threshold level of blank pixels and identifying a corresponding region of interest in the captured image and detecting background noise in the region of interest in the captured image.

In accordance with another aspect of the exemplary embodiment, a method of identifying image quality defects includes obtaining an electronic image including electronic image data, identifying a region of interest in the electronic image, the region of interest including at least a threshold level of blank pixels, rendering an image based on the electronic image data, capturing the rendered image, the captured image including captured image data, registering the electronic image with the captured image, identifying a region of interest in the captured image corresponding to the region of interest in the electronic image and detecting background noise in the region of interest in the captured image and identifying image quality defects based on the detection.

DETAILED DESCRIPTION

Figure 1:
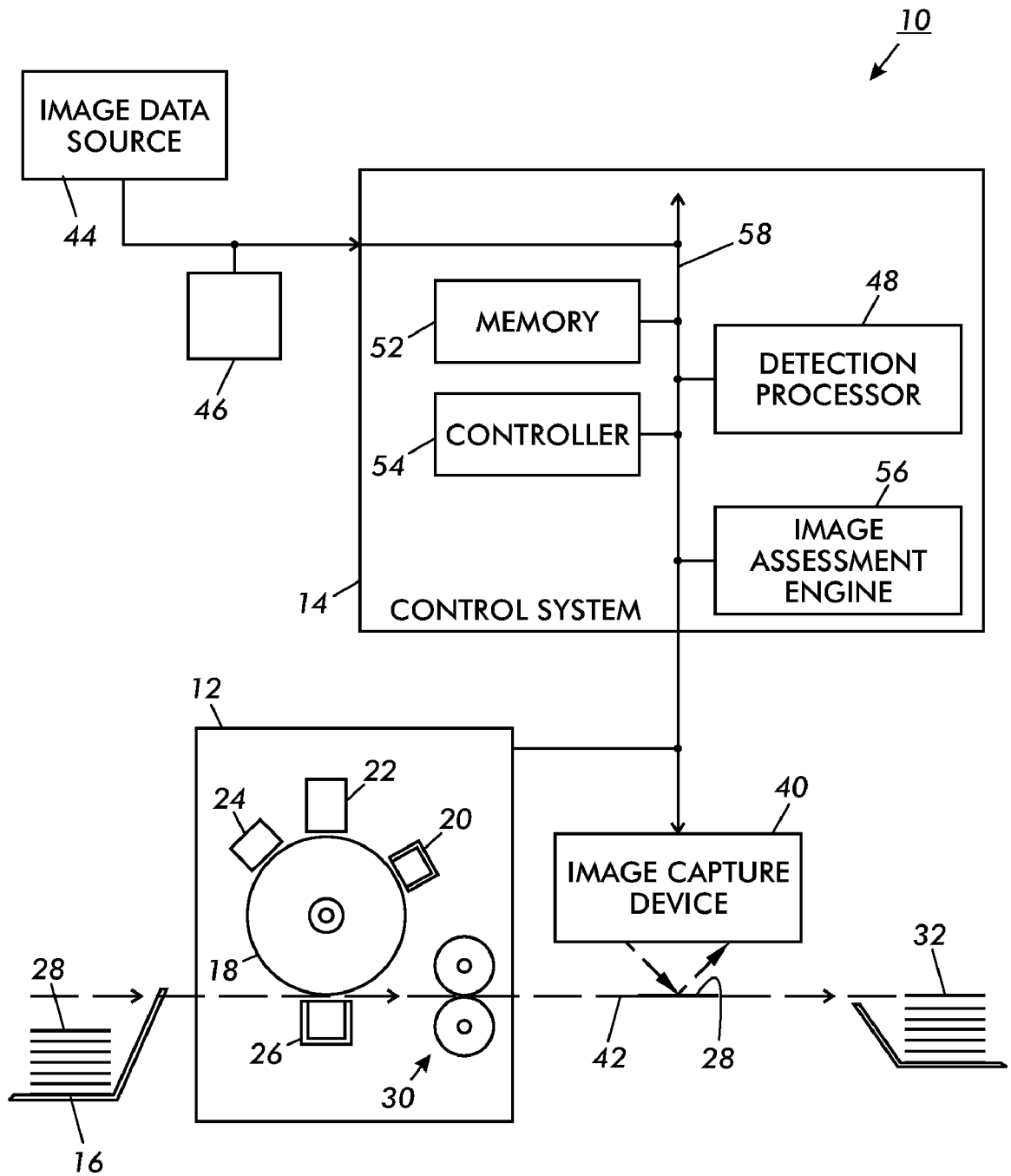
FIG. 1 is a functional block diagram of an exemplary background noise detection system in accordance with one aspect of the exemplary embodiment.

With reference to FIG. 1, an exemplary background noise detection system is shown. The detection system identifies rendered images (hardcopies) with image quality defects due to unacceptable levels of background noise. Without intending to limit the exemplary embodiment, the background noise may be largely attributed to wrong-sign toner. In general, the background noise in the hardcopy comprises spots having an average diameter of about 1-2 pixels or less and a maximum diameter which is generally no more than about 5 pixels at a resolution of 600 spots per inch (spi).

The exemplary detection system includes an image rendering device 10, which includes one or more marking devices 12 under the control of a common computer control system 14. The image rendering device may be, for example, a printer, copier, or multifunction device with printing and copying functions.

The marking device 12 may be a printer or other device capable of rendering an image in a tangible medium. Sheets of print media, such as paper, are delivered to the marking device 12 from a paper source 16, under the control of control system 14. The exemplary marking device 12 is a xerographic marking device and includes a charge retentive surface, such as rotating photoreceptor 18, in the form of a belt or drum. Disposed at various points around the circumference of the photoreceptor 18 are xerographic subsystems which include a charging station for each of the colors to be applied (one in the case of a monochrome printer, four in the case of a CMYK printer), such as a charging corotron 20, an exposure station 22 (generally one for each color separation), which forms a latent image on the photoreceptor, and a developer unit 24, associated with each charging station for developing the latent image formed on the surface of the photoreceptor by applying toner to obtain a toner image. A transferring unit, such as a transfer corotron 26, transfers the toner image thus formed to the surface of a print media substrate, such as a sheet of paper 28. A fuser 30 fuses the image to the sheet, by application of heat and pressure. In the case of a color image, the successive color separations may be built up in a superimposed manner on the surface of photoreceptor 18, and then the combined full-color image is transferred at transferring unit 26 to an output sheet. Alternatively, the subsystems for each color separation are associated with a separate photoreceptor and transferred to the paper by an intermediate transfer drum. The output sheet is then run through the fuser 30, as is familiar in xerography. In other embodiments, a plurality of marking devices may be arranged in sequence, each marking engine successively building up the image by applying a different colored toner. The printed sheet, with the fused toner image thereon, is transferred to a finisher 32. While a xerographic marking device is illustrated, it is to be appreciated that the marking device can comprise any other device for applying marking material to a substrate, such as an inkjet printer using liquid or solid inks, or the like.

An image capture device 40, such as a scanner, camera, or the like, captures an image of the printed sheet. The scanner, or other image capture device, may be an inline device, as shown, which is positioned downstream of the marking engine(s) 12, either in the paper path 42 between the marking engine and the finisher, or in a side path. Alternatively, the scanner may be an offline device, with the marked sheets being transferred manually to the scanner. In the exemplary embodiment, the image capture device is an inline scan bar of relatively high resolution, which scans the marked sheets automatically, under the control of the control system 14. The scan bar may be a color scanner, e.g., one that obtains image data for three color separations, generally red green and blue separations (RGB), or a monochrome scan bar.

An image data source 44 is arranged to provide image data of an original image 46 to the marking device 12 and to a detection processor 48. In the exemplary embodiment, the original image 46 is a customer image or set of images, in the form of digital documents. Source 44 may be a general purpose computer, e.g., a desktop computer, laptop, or the like, a dedicated computing device, a memory storage device, a server, a scanner, a facsimile machine, or any other device capable of providing electronic image data. The customer images may comprise text, graphics, photographs, a combination thereof, or the like. The digital document received by the image rendering device may include one or more of such images and be accompanied by data representing instructions for printing, e.g., in the form of a job ticket.

The detection processor 48 executes instructions for identifying customer images suitable for background noise detection and for detecting image quality defects in a rendered image, and may further execute instructions for evaluating the rendering device 10 based thereon. The operation of the detection processor will be best understood with reference to the method described in further detail below with reference to FIG. 2. Accordingly, only a brief description of its operation is provided here. The detection processor 48 may be embodied in hardware or software. For example, the detection processor may be a device such as a computer system, a processor or other device capable of manipulating and/or analyzing image data or may be hosted by such a computing device. In the exemplary embodiment, the detection processor is hosted by the control system 14 of the imaging device. However, it is also contemplated that the detection processor 48 may be located elsewhere in the image rendering device 10 or remote therefrom, such as on a server.

As shown in FIG. 1, the detection processor 48 communicates with a memory 52, a controller 54, a diagnostic system 56 (each of which may be hosted by the control system), and other components of the detection system by one or more control and/or data buses 58.

The image capture device 40 is arranged to provide image data of the captured image to the detection processor 48. The detection processor 48 receives the original image data 46 from the image data source 44 and the captured image data from the image capturing device 40. The detection processor 48 identifies any regions of interest in the original image which comprise a threshold of blank pixels. The detection processor 48 then processes a subset of the captured image data to detect background noise. For example, the processor examines the data on a pixel by pixel basis in a selected region or regions of interest corresponding to blank space in the original image to determine whether the pixel is blank. Based on the determination, the detection processor 48 may determine image quality defects (primarily arising from background noise) in the rendered image and may evaluate the marking device 12 based on the determined defects.

The memory 52 may be implemented using any appropriate combination of alterable, volatile or non-volatile memory or non-alterable, or fixed, memory. The alterable memory, whether volatile or non-volatile, can be implemented by using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, and gaps in optical ROM disk, such as a CD ROM or DVD ROM disk and disk drive, or the like. In one embodiment, the memory 52 and detection processor 48 are combined in a single chip. The exemplary memory 52 stores instructions executed by the processor 48 as well as the original image data, captured image data, and data generated during the comparison.

In operation, original image data is output from the original data source 44. The controller 54 receives the original image data and stores the original input data in the memory 52 at any desirable resolution. The controller 54 may convert the original input data to a form that is recognized by image processing algorithms stored in the memory 52 and in a color space of the marking engine 12. The controller 54 stores the converted input image data in the memory 52. The controller 54 sends the converted input data, optionally after further processing, to the marking engine 12, which renders the converted original image data in a tangible medium, such as paper or other print medium. The controller 54 stores the rendered image data in the memory 52. The image capture device 40 captures an image of the rendered image. The controller 54 stores the captured image data from the capture device in memory 52 and subsequently provides the captured image data to the detection processor 48. The detection processor 48 processes the original image data to identify regions of interest, aligns the captured image data (optionally at a resolution corresponding to the resolution of the stored converted original image data) with the original image to identify the regions of interest in the captured image and may store the captured image data for the regions of interest in memory 52. The detection processor 48 processes the captured image data in the regions of interest to identify background noise, where present, e.g., on a pixel by pixel basis to determine errors at the identified regions of interest between the pixel values and a background, such as paper white. Based on the determined error, the detection processor 48 may determine image quality defects in a rendered image and evaluate the marking engine 12 to determine an amount of adjustment or repair required to mitigate or avoid the image quality defects. The detection processor may communicate with the image assessment engine 56 of the image rendering device, which has access to other data from the marking engine, other components of the image rendering device, and/or an internal or external knowledge base, for assisting in the characterization of a defect in the image rendering device and/or identifying an appropriate adjustment or repair.

Figure 2:
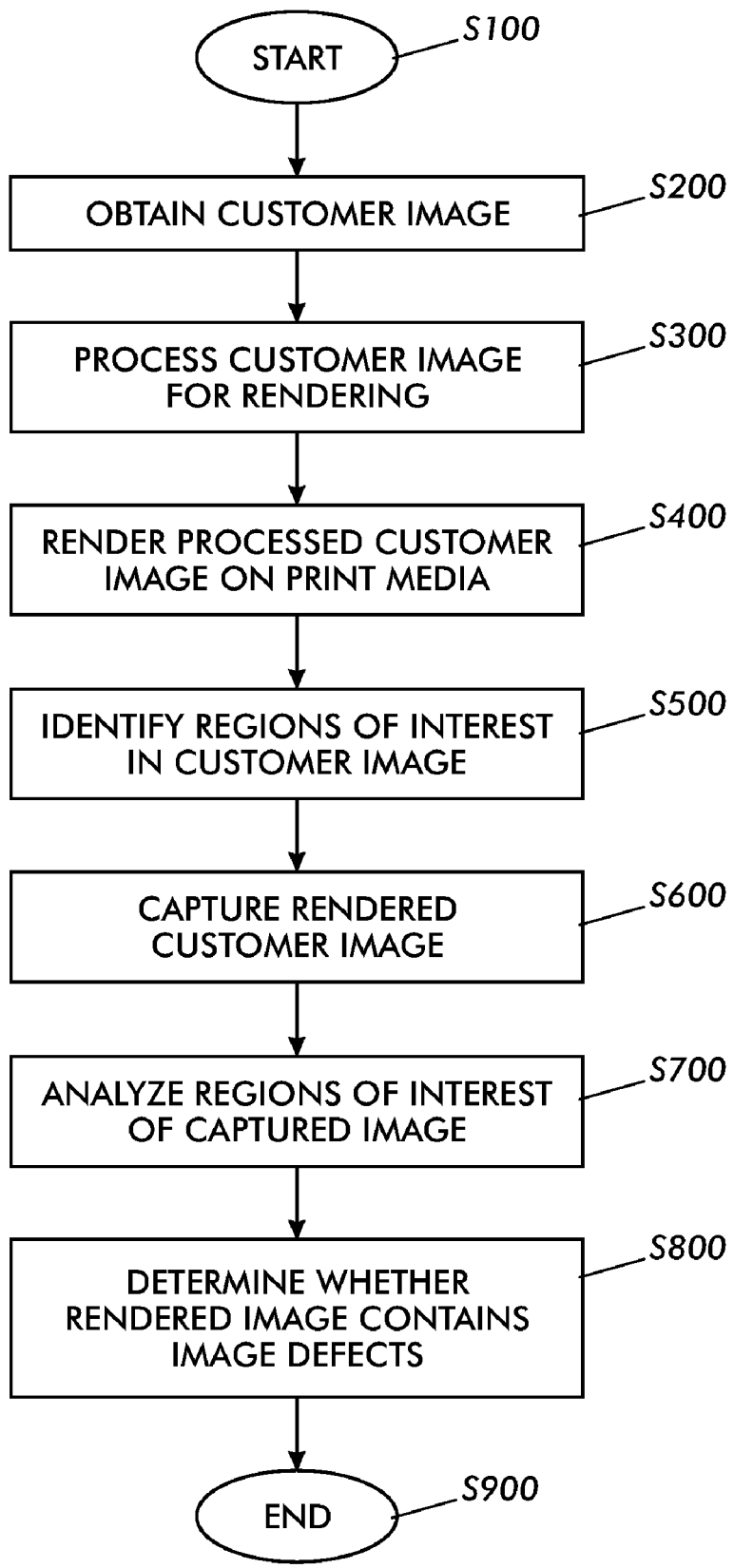
FIG. 2 is a flow diagram illustrating an exemplary method for background noise detection in accordance with another aspect of the exemplary embodiment.

With reference now to FIG. 2, a flowchart illustrating a method for detection of defects in rendered images and thereby determining whether a rendering device is defective is shown. The method may be performed with the detection system of according to FIG. 1. As will be appreciated, the method may include fewer, more or different steps from those outlined below and the steps need not proceed in the precise order illustrated. The method begins at S100.

At S200, original image data is obtained.

The original image data obtained in S200 is optionally processed at S300 to place it in a form for rendering on a marking device, and is rendered on print media at S400. At S500, the original image data (as received or after processing) is processed to identify one or more regions of interest comprising useful (blank) pixels. At S600, the rendered image is scanned or otherwise captured. At S700, the image data of the captured image is analyzed to identify pixels constituting background noise in the regions of interest. At S800, a determination is made as to whether the rendered images include image quality defects based at least in part on the analysis. The method ends at S900. Further details of these steps now follow.

In S200, the original image data may be obtained by any known or hereafter developed method or device capable of providing electronic image data, such as by image processing software or image capture using, for example, a camera, scanner or other device. In the exemplary embodiment, the original image data comprises one or more customer images which a customer desires to render on the image rendering device as one or more copies.

In S300, the original image may be converted from a color space in which it is received from the source 44 (e.g., RGB or L*a*b*) to a color space in which it can be rendered by the marking engine 12 with corresponding colorants, such as cyan, magenta, yellow, and optionally black (CMYK) toners. In the case of a monochrome marking device, a single colorant (e.g., black, K) may be used. The preprocessing step may further include modifying the pixel values by application of tone reproduction curves (TRCs), or the like.

In S400, the original image is generally rendered by application of colorants (e.g., toners) to print media and optionally fusing the colorants to the print media.

In S500, an optionally reduced resolution original image is analyzed to determine whether it contains at least one region of interest. A region of interest is generally one which comprises at least a threshold quantity (number and/or area) of contiguous usable pixels. Usable pixels are generally white (blank) pixels, i.e., pixels to which no colorant coverage is assigned. Thus, in the case of a color image formed with a plurality of colorants, blank pixels generally have a colorant value (gray level) corresponding to no colorant for each of the color separations in the image. However, in some embodiments, each color separation (e.g., C, M, and Y) is treated separately, in which case, a pixel is considered usable if it is blank at least for the respective color separation. As will be appreciated, a region of interest generally includes only pixels which are blank, i.e., the entire region of interest is made up of blank pixels. In some customer documents, one or more pages may be intentionally left blank. Where an entire page under analysis happens to be blank, the region of interest can comprise all pixels in the page.

Figure 3:
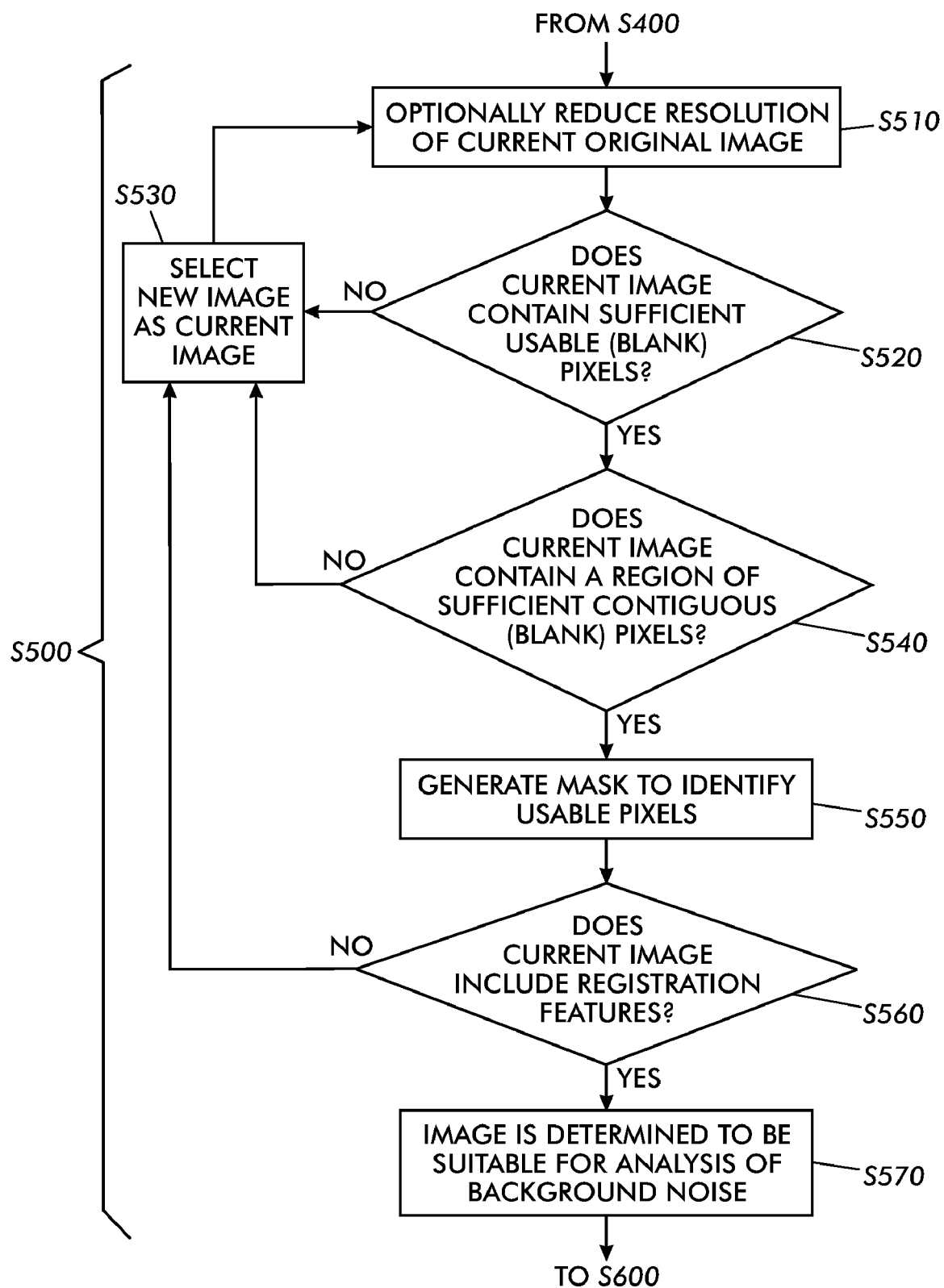
FIG. 3 is a flow diagram illustrating part of the exemplary method of FIG. 2.

FIG. 3 is a flowchart outlining in greater detail an exemplary method of processing the original image data to identify regions of interest (S500). At S510, the resolution of the original digital image (as received or after preprocessing at S300) may be reduced. The resolution is generally reduced to increase processing speed. This step can therefore be omitted where processing capabilities permit. For example, the resolution may be reduced to 50% or less of the original resolution and in one embodiment, 25% or less of the original resolution, e.g., a resolution of about 300 or 150 spi (spots per inch) or lower, and in general at least 35 spi, such as at least about 75 spi. As will be appreciated, where the resolution of the original image is reduced, the pixel values in the reduced resolution original image are average values derived from those of the corresponding pixels of the original image at full resolution.

At S520 usable pixels in a current original image are identified. S520 may include a pixel by pixel analysis of at least a portion (e.g., all) the pixels in the full or reduced resolution original image to determine whether the pixel is usable. If the total number of usable pixels in the image is below a threshold number, the current image may be determined to be unsuitable for analysis of background noise and the method may proceed to step S530, when a new image is selected.

At S540 a determination is made as to whether a measure (e.g., the number or area) of contiguous usable pixels is at or exceeds a predetermined threshold value. The number/area of contiguous pixels required to meet the threshold may depend on the resolution. In general, a region of interest contains at least about 50 contiguous usable pixels (at the reduced resolution), or an area of at least 7×7 contiguous usable pixels, such as at least 20×20 usable pixels.

If at S540, the threshold is met, the image is considered to include a region of interest and the method proceeds to S550. If not, the method may proceed to S530 where the next image in the customer document is selected as a current image and analyzed to determine whether it contains a region of interest.

At S550, a mask may be generated of the original optionally reduced resolution image which identifies the usable pixels. The mask is stored to memory for later use with the captured image.

At S560, the image may be analyzed to determine whether it contains features suitable for registration, such as edge features. Therefore, only pages that are capable of being registered can be identified for subsequent analysis. If not, the method may return to S530. If the current original image has been determined to contain at region of interest (and optionally also sufficient registration features), the image is considered to be usable for background noise detection. The method may then proceed to S600.

In other words, if a page of the original image contains blank regions that are not sufficiently large to be useful and/or contains too few registrable features, then it may be desirable to skip that page scan. The preliminary analysis to identify pages that are not considered useful for scanning reduces processing time and communications bandwidth by not subsequently scanning the identified pages. However, in other embodiments, pages may be scanned without a prior determination of their usefulness. For example, if the scanner 40 is provided as an internal component of the image rendering device 10, all pages of the original electronic image may be automatically scanned, but the associated input image data of pages that are not subsequently identified as having regions of interest may not be analyzed by the detection processor 48. If the scanner is provided externally of the printer, an operator may decide to skip the scan of particular pages by manually discarding pages that do not contain regions of interest.

At S600, the rendered optionally preprocessed original image is captured by the scanner. This step may include acquiring image data representative of colorant values of one or more color separations for pixels of the image.

Figure 4:
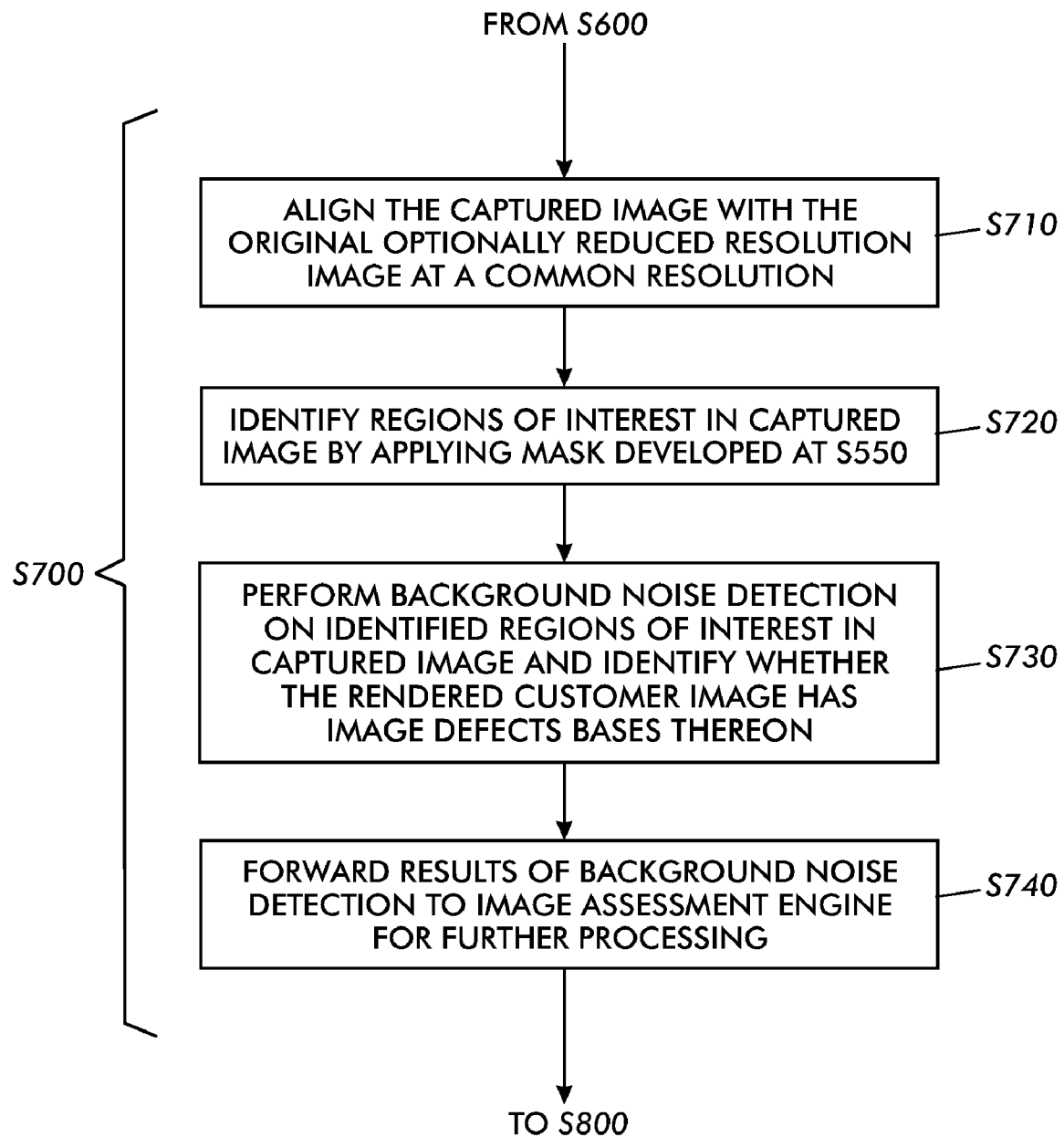
FIG. 4 is a flow diagram illustrating part of the exemplary method of FIG. 2.

FIG. 4 is a flowchart outlining in greater detail an exemplary method of analyzing the image data of the captured image for the regions of interest (S700). At S710, the captured image is aligned with the original optionally reduced resolution image at a common resolution. For example, the scanned image data may be converted to the same resolution as the reduced resolution original image.

At S720, usable pixels in regions of the captured image corresponding to the regions of interest in the original image are identified. In one embodiment, the mask developed at S550 is applied to the captured image to exclude the pixels corresponding to the non-white pixels of the original image from further consideration. The masked area may be increased, for example, by a predetermined number of pixels at its perimeter, to allow for any slight misregistration of the images. By excluding pixels which are close to image content, the registration of the original and captured images (S710) can be more relaxed.

At S730, background noise detection is performed on one or more of the region(s) of interest (usable pixels) of the captured image. In general, any usable pixel which is not blank (i.e., has at least a threshold color difference from background) may be considered to represent background noise. In some embodiments, background noise may be computed on a pixel by pixel basis by comparing with corresponding data for an average background color such as that of paper white. In other embodiments background noise may be computed globally for one or more regions of interest e.g., by comparing a histogram for the region(s) of interest with that of a background image, e.g., of white paper.

Although the analysis of the scanned image data for detection of background noise may be performed at the same reduced resolution as that of the original image when the locations of regions of interest were originally determined, it should be appreciated that it is not necessary to do so, since the mask may be converted to a suitable resolution for overlaying the appropriate regions of the captured image. Moreover, once the regions of interest in the captured image have been identified by application of the mask, the image data in these regions may be analyzed at any suitable resolution for identifying background noise.

In one embodiment, the region of interest is examined pixel by pixel to identify pixels which are not blank. In this embodiment, a pixel is not blank if its delta E ($\Delta E$) is at or exceeds a predetermined threshold value, where $\Delta E$ represents a determined difference between its sensed color (at the selected resolution) and a background color, such as the color of the print media on which the image is rendered or a representative paper white. For example, the color difference may be determined in the color space of the scanner (e.g., RGB), the color space of the marking engine (e.g., CMYK) or in an international standard color space such as a CIE L*a*b* color space or any other device independent color space, such as L*, u*, v*.

$\Delta E$ may be computed as a function of two or more color values such as a function of the differences between the sensed color values (e.g., L*, a*, b* values in the CIELAB color space) for the captured image pixel and the corresponding color values for the background color. In one embodiment $\Delta E$ is determined as the Euclidian distance between the sensed and background color values, which in the case of L*, a*, b* can be determined according to the formula:

$$\Delta E^*_{ab} = \sqrt{(L^*_2 - L^*_1)^2 + (a^*_2 - a^*_1)^2 + (b^*_2 - b^*_1)^2}$$

where $L^*_2$, $a^*_2$, $b^*_2$ represent the L*, a*, b* values of the pixel of interest in the captured image and $L^*_1$, $a^*_1$, $b^*_1$ represent the L*, a*, b* values of the background (e.g., values sensed from the paper itself or assumed as a standard white).

In one embodiment, the value(s) for the paper white ($L^*_1$, $a^*_1$, $b^*_1$) can be calculated from an array of pixel counts at different color values in a portion of the scanned image which should be white (e.g., pixels in a region of interest or pixels outside the normal printed area of the page or of a nominally blank sheet). For example, a histogram of pixel counts (number or percentage) for color values close to the white end of the range is generated for pixels of the region of interest. Provided that background noise is not extreme, a good estimate of paper white can be computed by finding the start of the tail of the primary peak of the histogram (which corresponds to the white pixels), such as the three sigma value. The paper white values can be determined as the average of values between the 3 sigma value and the peak.

The pixel may be classified as a background noise pixel if its $\Delta E$ at least meets the predetermined threshold. In one embodiment, a ratio of the number of background noise pixels to the total number of pixels analyzed is used as a measure of the level of background noise. As the ratio increases, the background noise is considered to be higher and therefore more of a problem. For example, the rendered image may be considered to exhibit an image quality defect (at S800) if at least a threshold proportion of the pixels analyzed in the region(s) of interest are classed as background noise pixels.

In another embodiment, the determined $\Delta E$ can be used as a measure of the strength of the background noise. Where $\Delta E$ is relatively high for a background noise pixel, the background noise is considered strong, where lower, the background noise is considered weaker. In one embodiment, a combination of both the relative number of background noise pixels and their relative strengths can be used in a determination of the overall severity of background noise. The classification of an image as either having or not having an image defect may thus be based on both the proportion of the background noise pixels and their relative strengths.

In another embodiment, an absolute value of the cumulative computed $\Delta E$s for a set of pixels can be used as a measure of the severity of the background noise.

During the detection step, the $\Delta E$ values for at least those pixels which reach or exceed a predetermined threshold value may be stored in memory. Or a cumulative $\Delta E$ value for the pixels analyzed may be stored.

In the embodiment where each color separation is considered independently (or the image is a monochrome, e.g., black image), $\Delta E$ may be computed as the simple difference between two values, namely, the sensed value and the background value for the particular color separation. In this embodiment, it may be beneficial to convert the sensed colorant values to values in marking device dependent color space. For example, RGB color differences may be converted to a CMYK colorant space as described, for example, in U.S. Pub. No. 2006/0038828 to Klassen, et al., herein incorporated by reference. This allows the source of the background noise to be tracked, for example to a particular developer station 24. For example, if only the yellow (Y) separation is showing background noise, then it can be assumed that the problem may be specific to the yellow developer station 24. Alternatively, the color separations of the scanner 40 may be used as a representative of the corresponding colorant separation. For example, the blue channel of an RGB scanner may be used to detect background noise for the yellow colorant, the green channel for magenta colorant, the red channel for cyan colorant. For monochrome black (K) colorant, a combination of all three channels may be used in suitable proportions.

In another embodiment, instead of calculating $\Delta E$ for each pixel, a global estimate of background noise is performed. In this method, a data structure (e.g., histogram) of values for pixels in the region of interest is generated and compared with a corresponding histogram for background, such as white paper of the same stock used in printing the customer image. For example, the image data for one or more regions of interest is processed such that for each of a set of colorant levels (bins), each bin representing one or more colorant (gray) values, the number of pixels is recorded and represented in the histogram as a pixel count (number or percentage of the total number of pixels processed). The colorant levels selected for the histogram may be close to the white end, such as in the region from about 235-255 in an 8 bit system, where 255 represents no colorant (white). As will be appreciated, even though the background noise pixels in a monochrome print may be the result of black toner particles, which themselves have a gray value close to 0, the small size of the toner particles, blurring of image by the scanner, and/or the subsequent reduction of resolution of the captured image, generally results in the examined background noise pixels having a value which is much closer to white than black. Accordingly, it is generally not necessary to consider the entire spectrum of gray values in the histogram.

In one embodiment, for each colorant level, a difference (or ratio) between the histogram value from the captured image data and the histogram value for the corresponding background image is determined. If one or more of the bins is at or exceeds a threshold difference (or ratio), the image is determined to have an unacceptable level of background noise. In yet another embodiment, the cumulative histograms of the captured image area and the background image may be compared using a statistical test, such as the Kolmogorov-Smirnov (KS) test. If the statistical test indicates a low probability that the captured image pixels and the background image pixels come from the same distribution, the image may be determined to have background noise. The value returned by the statistical test may be compared to a threshold value to determine whether the level of background noise is unacceptable.

The number of bins selected for the comparison is not critical, for example two or more bins may be used, such as 8-20 bins in the range 238-255 on an 8-bit scale.

In another embodiment, the populations of the pixel values from the captured image data and the corresponding background image are compared using a statistical test not involving a histogram, such as a test comparing population variation, e.g., an F test. Again, a result indicating a low probability that the pixels in the captured image data and the corresponding background image come from the same population indicates the presence of background noise.

As with the pixel by pixel method, for a color image rendering device, this method may be performed for two or more color separations independently, with a view to identifying the source of the background noise.

The background noise detection step (S730) may be performed in two stages. For example, in the first stage, background noise is performed at a first, low resolution on usable pixels, such as at about 70-200 spots per inch (spi) resolution, e.g., at the same resolution as was used for the original image in step S520. Analysis at such a resolution is relatively fast and thus can allow identification of background noise problems fairly quickly. If a background noise problem is detected, in the second stage, background noise detection is performed at a higher resolution, e.g., at 300 spi resolution, or higher, where a more accurate computation of background noise can be made. Additionally, the second stage may focus on those regions of interest where background noise was detected in the first stage.

At S740, captured image data for the usable pixels may be sent to an image assessment engine/diagnostic engine 56 (e.g., AIQD) for a more in depth analysis, e.g., a determination of the shapes and sizes of spots, any regularity in their distribution, an assessment of the change in the severity of background noise over time, and the like. This step may include combining information on background noise with information from other sources, such as current/voltage sensors in the developer stations, information from a knowledge base, and the like to provide a diagnosis of the cause of the background noise.

In one aspect of the exemplary embodiment, the above method may be briefly summarized as follows: first, a reduced-resolution digital original of the customer page is analyzed pixel by pixel to create a mask of usable pixels for background noise detection. Here the usable pixels are those that are white (i.e. no coverage of colorant). If the number of (contiguous) usable pixels exceeds a pre-specified threshold, the customer page is scanned and aligned with the reduced-resolution original. Otherwise, operation moves on to the next page. Background noise detection is performed on usable pixels only to determine whether a usable pixel contains background noise. The exemplary approach is to compute the deltaE between the color sensed of a usable pixel and the paper white and then classify the pixel as noise if the deltaE exceeds a pre-specified threshold. Additionally, the values of deltaE to paper (rather than just a classification of "background noise pixel" or "not background noise pixel") can be stored in memory as a measure of the strength of the background noise in that pixel. Optionally, the content (pixel values) of the usable pixels can be passed to an image assessment engine for more in-depth analysis (e.g. size/shape of the spot, etc.).

With an inline scanner, the entire method can be performed automatically, without the need for user input. If an image quality defect is determined to be present, an automated notification can be displayed on the device or sent to the customer or a service engineer. It is generally not necessary for background noise to be determined for every customer document. For example, the controller may initiate determination of noise periodically or intermittently, such as every 5000 copies.

The method illustrated in FIG. 2 (or at least the computer implemented steps S500, S700 and S800) may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The detection steps of the exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing at least the steps S500, S600, and S700 of the flowchart shown in FIG. 2, can be used in the implementation of the method for detecting image quality defects.

Without intending to limit the scope of the exemplary embodiment, the following example demonstrates aspects of the exemplary embodiment.

EXAMPLE

A scan (from a commercial desktop scanner) of a one inch square taken from a copy of a document was obtained at normal resolution (600 spi). The scan showed substantial background noise in the form of small dots substantially smaller in size than any of the characters in the normal text font of the document. At 75 spots per inch resolution, the background noise remains but it is no longer visible, and it is harder to detect, as is the level of paper white.

Figure 5:
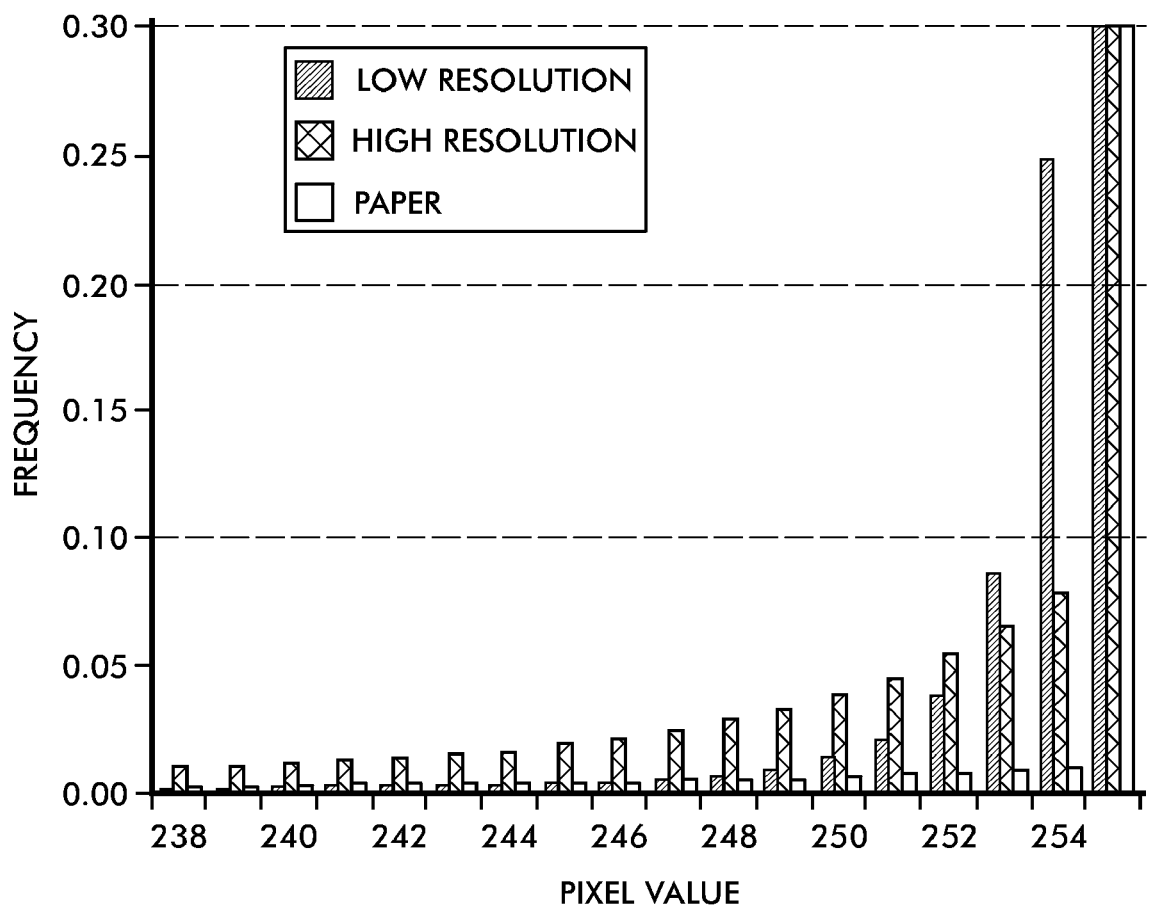
FIG. 5 is a histogram showing percentage of pixels vs. colorant value (gray level) for scanned document at high and low resolution and for a white sheet.

FIG. 5 shows a cumulative histogram of the high resolution (600 spi), and the low resolution (75 spi) scans, along with a cumulative histogram of a section of paper (from the same image) containing essentially no background noise. From the histograms it may be concluded that a robust estimate of paper white is harder to obtain from the low resolution version. Further on this scanner, paper registers values mostly at 255, but down to as little as 238. Thus, in a histogram method, it is desirable to obtain significant counts for values below 246 for detecting background noise. It is clear that the histogram of even the low resolution scan looks noticeably different from that for paper. To improve the reliability, reducing false-positives, on those pages for which the low resolution detection indicates background noise, it was determined that the high resolution image should be processed as well, at least in regions in which the low resolution processing found a significant difference from white.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of detecting background noise in a rendered electronic image, comprising:
    with a processor, identifying a region of interest in an electronic image the region of interest including at least at least a threshold quantity of blank pixels;
    capturing a rendered image to generate captured image data, the rendered image having been derived from the electronic image by rendering the image with an image rendering device; and
    identifying, from the captured image data, a subset of the image data corresponding to the region of interest in the electronic image; and
    providing for, from the subset of image data, detection of background noise in the rendered image not present in the electronic image by comparing the image data with background image data.

2. The method of claim 1, wherein the region of interest includes at least a threshold number of contiguous blank pixels.

3. The method of claim 1, wherein the blank pixels are pixels that have no color assigned for at least one color separation.

4. The method of claim 3, wherein the detecting includes detecting background noise for one of the at least one color separations.

5. The method of claim 1 wherein the detecting background noise includes comparing color values of pixels in the subset of image data to a color value or values of pixels of the background image data.

6. The method of claim 5, wherein the background image data is derived from the subset of image data by excluding pixels having a color value which differs from blank by more than a threshold level.

7. The method of claim 5, wherein the detecting includes, for each of a plurality of pixels, computing a difference between a color value or values of the pixel and a color value or values of the background.

8. The method of claim 7, wherein the comparing includes computing a statistical test.

9. The method of claim 7, wherein the statistical test compares cumulative histograms.

10. The method of claim 7, wherein the statistical test compares population variations.

11. The method of claim 5, wherein the comparing includes deriving a data structure comprising pixel counts of pixels in the region of interest of the captured image for each of a set of color values and comparing the data structure with a data structure comprising corresponding pixel counts for the background.

12. The method of claim 1, further comprising identifying image quality defects in the image, based on the comparison.

13. The method of claim 1, wherein the identifying of the subset of data in the captured image comprises applying a mask derived from the electronic image to the captured image.

14. The method of claim 13, wherein the mask derived from the electronic image is modified to exclude pixels at a perimeter of the region of interest for the detecting of background noise.

15. The method of claim 1, wherein the detecting background noise includes computing a quantity of background noise pixels.

16. The method of claim 14, further comprising identifying whether the image includes image quality defects based at least in part on the quantity of background noise pixels.

17. The method of claim 15, wherein an image quality defect is identified where at least a threshold quantity of the background noise pixels are detected.

18. The method of claim 1, wherein the capturing includes capturing an image of the rendered image only when the electronic image is determined to include at least one region of interest.

19. The method of claim 1, further comprising identifying a source of the background noise.

20. The method of claim 1, wherein the electronic image is a customer image which includes at least one region not of interest in which the pixels are not blank.

21. A background noise detection system comprising memory which stores instructions for performing the method of claim 1 and a processor in communication with the memory which executes the instructions.

22. A computer program product comprising a computer readable medium encoding instructions, which when executed on a computer causes the computer to perform the method of claim 1.

23. A background noise detection system, comprising:
a source of an electronic image, the electronic image including electronic image data;
a marking device for rendering an image based on the electronic image data;
an image capture device for capturing the rendered image, the captured image including captured image data; and
a detection processor for identifying a region of interest in the electronic image, the region of interest including at least a threshold quantity of contiguous blank pixels and identifying a corresponding region of interest in the captured image and detecting background noise in the region of interest in the captured image.

24. The background noise detection system of claim 22, further comprising:
a controller which automatically controls the image capture device and provides the captured image data to the detection processor.

25. The background noise detection system of claim 22, wherein the image capture device comprises an inline scanner.

26. A method of identifying image quality defects comprising:
with a processor,
receiving a set of electronic images, each of the electronic images including electronic image data;
identifying whether a first of the electronic images includes a region of interest which includes at least a threshold quantity of contiguous blank pixels;
where the first of the electronic images lacks a region of interest including at least a threshold level of blank pixels, repeating the identifying for at least a second of the electronic images to identify an electronic image including a region of interest which includes at least the threshold quantity of contiguous blank pixels;
rendering an image based on the electronic image data of the electronic image including the region of interest which includes at least the threshold level of blank pixels;
capturing the rendered image, the captured image including captured image data;
registering the electronic image which includes at least the threshold quantity of blank pixels with the captured image;
identifying a region of interest in the captured image corresponding to the region of interest in the electronic image which includes at least the threshold quantity of blank pixels;
detecting background noise in the region of interest in the captured image; and
identifying image quality defects based on the detection.

27. The method of claim 1, further comprising: evaluating the image rendering device for defects based on the detected background noise.

28. The method of claim 1, wherein the threshold quantity comprises an area of at least 7×7 contiguous pixels.

29. The method of claim 1, wherein the identifying a region of interest in an electronic image comprises examining electronic images to identify an electronic image comprising a region of interest which includes at least at least the threshold quantity of blank pixels.

30. The method of claim 2, wherein the threshold number of contiguous blank pixels is at least 50.

* * * * *